Sept. 2, 1930.  R. VORBAU  1,774,858
METHOD OF UNITING LAMINATED MATERIALS
Filed May 16, 1928
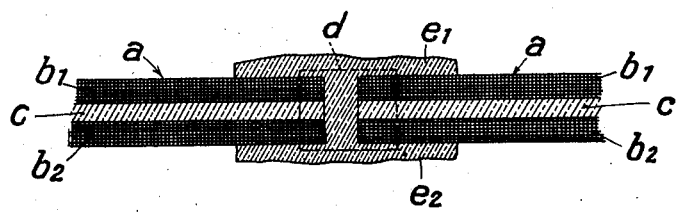
Inventor:
Robert Vorbau
By
Attorneys.

Patented Sept. 2, 1930

1,774,858

UNITED STATES PATENT OFFICE

ROBERT VORBAU, OF ORANIENBURG, NEAR BERLIN, GERMANY, ASSIGNOR TO DEUTSCHE GASGLÜHLICHT-AUER-GESELLSCHAFT MIT BESCHRÄNKTER HAFTUNG, OF BERLIN, GERMANY, A CORPORATION OF GERMANY

METHOD OF UNITING LAMINATED MATERIALS

Application filed May 16, 1928, Serial No. 278,251, and in Germany June 16, 1927.

In the manufacture of gas masks, gas and water tight bags, waterproof cloaks and the like, it is known to employ so called double materials or laminated fabrics. These laminated fabrics consist of two layers of fabric of the same or different character which are held together by means of an interposed layer of caoutchouc or rubber. This layer of rubber renders the cloth air and waterproof and serves at the same time as an adhesive. When using such laminated fabrics or when sewing them this operation was carried out up to now in such a manner, that both pieces of cloth were placed one on the top of the other and then connected by means of a suitable seam, and subsequently the holes pierced by the needle into the interposed layer or sheet of rubber were rendered tight by applying a rubber solution to said holes. This manner of connecting the pieces has the drawback, that the layer of rubber present on the outside of the cloth and also the threads of the seam will be worn off through mechanical action and the material will then no longer be tight.

In the following a method of uniting two pieces of cloth is described through which both pieces of cloth are connected so intimately, that they become almost one piece throughout. This method is practiced suitably in such a manner, that the two pieces of cloth are put together in co-planar edge to edge or butt fashion and are then connected by means of a seam or a zigzag seam and that on both sides of the laminated material over the joint or border a strip of so-called caoutchouc repair ribbon of suitable width is placed. The said strip of repair ribbon is pressed upon the laminated material by means of any suitable device, for instance metal rails and subsequently these metal bars are heated to about 100 degrees centigrade. At this temperature the strips of repair ribbon will become soft and they are forced between the joint of the layers of cloth and they will unite there with the layer of rubber situated between the fabric layers and at the same time they will cover the threads of the seam. During heating the repair ribbon is vulcanized and the said repair ribbon which formerly was soft and plastic, will assume after cooling the elastic property of rubber and it will unite both pieces or layers of cloth.

In the drawing one mode of execution is illustrated in which $a$ indicates the laminated cloth, consisting of the layers of fabric $b_1$ and $b_2$ and the layer of rubber or caoutchouc $c$. $d$ is the thread of the seam and the repair ribbon is designated by $e_1$ and $e_2$.

I claim:

1. The method of uniting sheets of laminated fabric having an intermediate layer of rubber, which comprises placing the opposing edges of said sheets in co-planar butt-joint relation, connecting said sheets by a seam, covering the seam with strips of repair ribbon of caoutchouc, and subjecting said strips of repair ribbon to vulcanization to render the joint gas and water-tight.

2. A sheet of laminated fabric having an intermediate layer of rubber, said sheet composed of two sections connected by a seamed butt joint, the seam and joint being covered by strips of vulcanized rubber to render the joint gas and water-tight.

In testimony whereof I affix my signature.

ROBERT VORBAU.